United States Patent
Garcia-Crespo et al.

(10) Patent No.: US 8,317,459 B2
(45) Date of Patent: Nov. 27, 2012

(54) SYSTEMS, METHODS, AND APPARATUS FOR PROVIDING A MAGNETIC SEAL

(75) Inventors: Andres Jose Garcia-Crespo, Greenville, SC (US); Gary Charles Liotta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 12/561,496

(22) Filed: Sep. 17, 2009

(65) Prior Publication Data

US 2011/0062671 A1    Mar. 17, 2011

(51) Int. Cl.
  *F04D 27/02*    (2006.01)
(52) U.S. Cl. .... 415/1; 415/173.1; 415/173.3; 415/174.2
(58) Field of Classification Search ............... 415/173.1, 415/173.3, 174.2, 1
  See application file for complete search history.

(56) References Cited

U.S. PATENT DOCUMENTS

| | | | |
|---|---|---|---|
| 5,029,876 A | 7/1991 | Orlando et al. | |
| 5,040,956 A | 8/1991 | Barito et al. | |
| 5,126,610 A * | 6/1992 | Fremerey | 310/90.5 |
| 5,613,829 A | 3/1997 | Wolfe et al. | |
| 5,749,584 A | 5/1998 | Skinner et al. | |
| 6,131,910 A | 10/2000 | Bagepalli et al. | |
| 6,220,602 B1 * | 4/2001 | Webster et al. | 277/410 |
| 6,257,588 B1 | 7/2001 | Bagepalli et al. | |
| 6,451,132 B1 * | 9/2002 | Walmer et al. | 148/303 |
| 6,527,274 B2 | 3/2003 | Herron et al. | |
| 6,739,094 B1 | 5/2004 | Berry et al. | |

* cited by examiner

*Primary Examiner* — Edward Look
*Assistant Examiner* — Adam W Brown
(74) *Attorney, Agent, or Firm* — Sutherland Asbill & Brennan LLP

(57) ABSTRACT

Embodiments of the invention can provide systems, methods, and an apparatus for providing a magnetic seal. According to one embodiment, a system having a magnetic seal can be provided. The system can include a rotary machine having a first component and a second component. A magnetic seal can be mounted to the first component and positioned relative to the second component to provide a gap between the magnetic seal and the second component. The magnetic seal can include a first magnetic element and a compliant material adapted to adjust in response to a force exerted on the magnetic seal by a second magnetic element. The second magnetic element can be mounted to the second component so that the gap between the magnetic seal and the second component can be modified in response to the force exerted by second magnetic element on the magnetic seal.

20 Claims, 4 Drawing Sheets

SYSTEMS, METHODS, AND APPARATUS FOR PROVIDING A MAGNETIC SEAL

FIELD OF THE INVENTION

The invention relates to a machine with rotating and stationary components, and more specifically, to systems, methods, and an apparatus for providing a magnetic seal.

BACKGROUND OF THE INVENTION

Rotary machines, such as steam and gas turbines used for power generation and mechanical drive applications, are generally large machines comprising rotating and stationary components. In operation, such rotary machines depend on the controlled flow of air between these components. In turbines, for example, high pressure air flowing through various turbine stages can pass through a series of stationary and rotating components. When passing through certain stationary and rotating components, air leakage, such as from an area of higher pressure to an area of lower pressure, is generally undesirable. Partially for this reason, seals between the stationary and rotating components can be used. In addition to controlling air leakage, seals can be used to direct air flow away from some components, such as bearing housings and rotor components, and towards other components, such as to purge cavities. The efficiency of rotary machines can depend on the ability of such seals to prevent air leakage and to direct the flow of air among rotating and stationary components.

A number of different seal designs have been used in rotary machines. These seals can include: "pumpkin teeth" seals; labyrinth seals; honeycomb seals; and brush seals. These designs are intended to minimize air leakage across components and to direct air flow between components. Because these seals can be positioned between rotating and stationary components, such seals can be in physical contact with these components. When the machine is in operation, friction between the rotating and stationary component can cause the seal to deteriorate. As the seal wears away, the machine's efficiency can suffer and the probability of failure can increase.

Thus, there is a need for an improved seal for reducing air leakage and controlling air flow in a rotary machine. More specifically, there is a need for systems, methods, and an apparatus for providing a magnetic seal.

BRIEF DESCRIPTION OF THE INVENTION

Embodiments of the invention can address some or all of the needs described above. Certain embodiments of the invention are directed generally to systems, methods, and an apparatus for providing a magnetic seal. According to one embodiment, a method for providing a magnetic seal in a rotary machine can be provided. The method can include mounting a magnetic seal to a first component in the rotary machine. The method can also include positioning the magnetic seal in relation to a second component to define a gap between the magnetic seal and the second component. The magnetic seal can comprise a first magnetic element and a compliant material adapted to adjust in response to a force exerted against the magnetic seal. The method can also include mounting a second magnetic element to the second component to exert force against the magnetic seal. The method can further include adjusting the compliant material in response to the force exerted by the second magnetic element to modify the gap.

According to another embodiment of the invention, a system for providing a magnetic seal can be provided. The system can include a rotary machine having a first component and a second component. A magnetic seal can be mounted to the first component and positioned relative to the second component to define a gap between the magnetic seal and the second component. The magnetic seal can include a first magnetic element and a compliant material adapted to adjust in response to a force exerted on the magnetic seal. A second magnetic element can be mounted to the second component and adapted to exert force against the magnetic seal so that the gap between the magnetic seal and the second component can be modified.

According to yet another embodiment of the invention, an apparatus for providing a magnetic seal can be provided. The apparatus can include a magnetic seal comprising a first magnetic element and a compliant material. The magnetic seal can be operable to mount to a first component in a rotary machine and to provide a gap between the magnetic seal and a second component in the rotary machine. A second magnetic element can be operable to mount to the second component in the rotary machine and to exert force against the magnetic seal. The compliant material can be operable to further adjust in response to the force exerted by the second magnetic element.

Other embodiments and aspects of the invention will become apparent from the following description taken in conjunction with the following drawings.

BRIEF DESCRIPTION OF THE DRAWINGS

Figure 1:
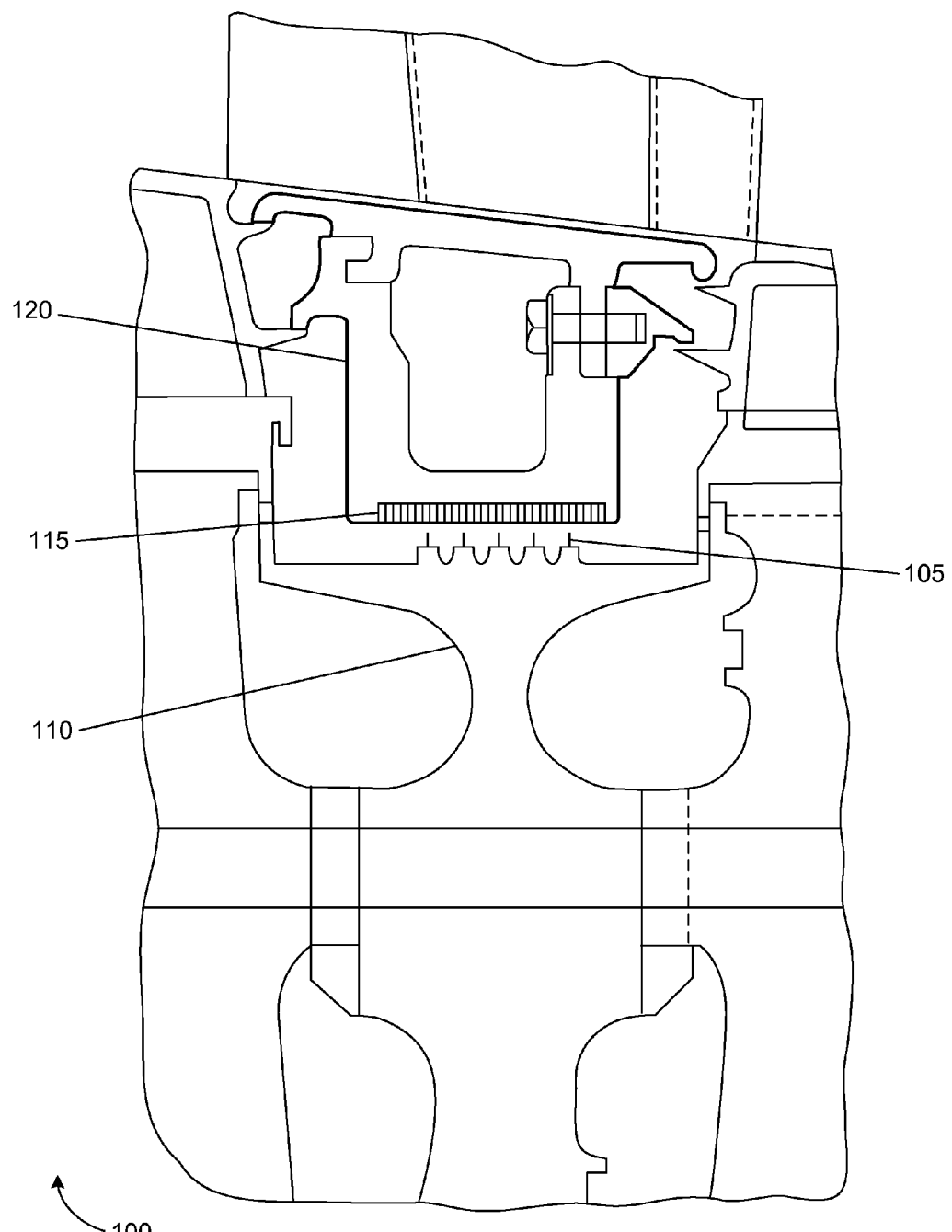

Having thus described the invention in general terms, reference will now be made to the accompanying drawings, which are not necessarily drawn to scale, and wherein:

FIG. 1 illustrates a stationary and rotating component as part of a rotary machine.

Figure 2:
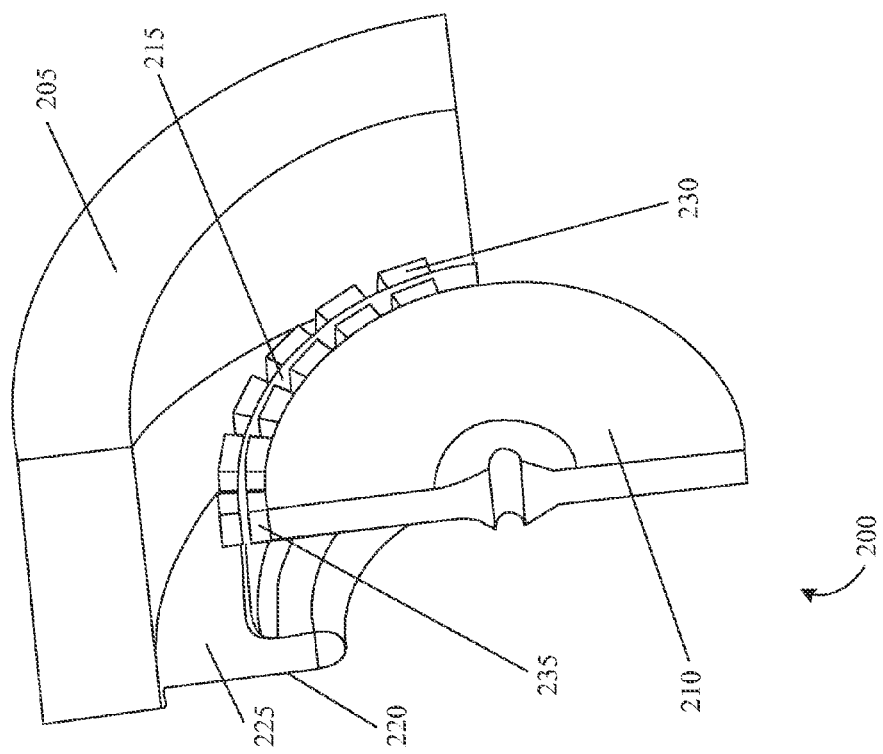

FIG. 2 illustrates an exemplary system for providing a magnetic seal in accordance with one embodiment of the invention.

Figure 3:
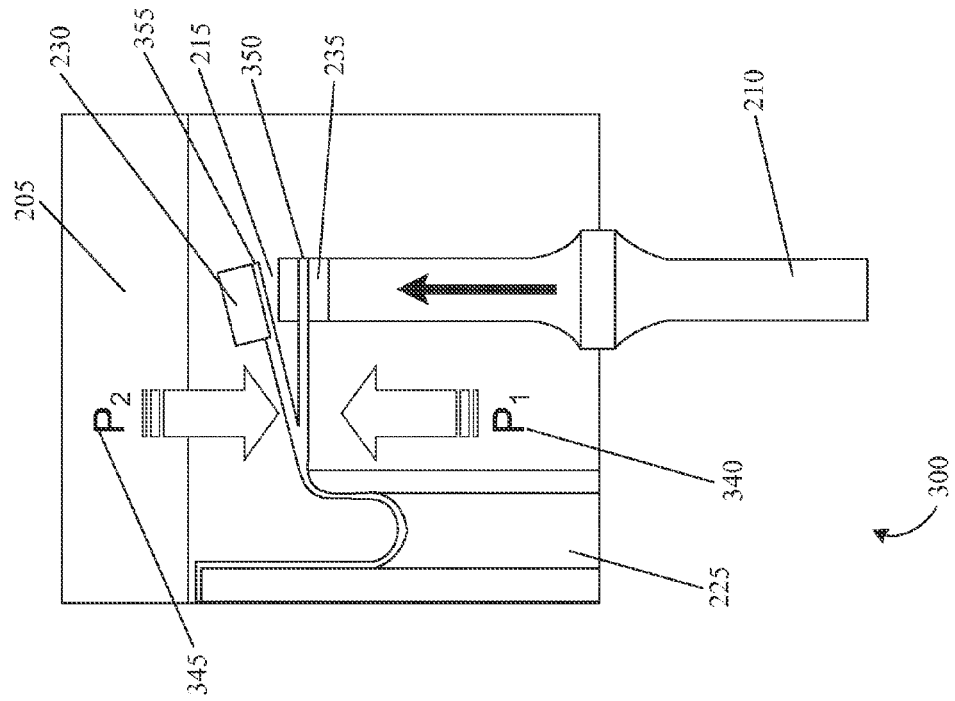

FIG. 3 illustrates an exemplary system for providing a magnetic seal in accordance with one embodiment of the invention.

Figure 4:
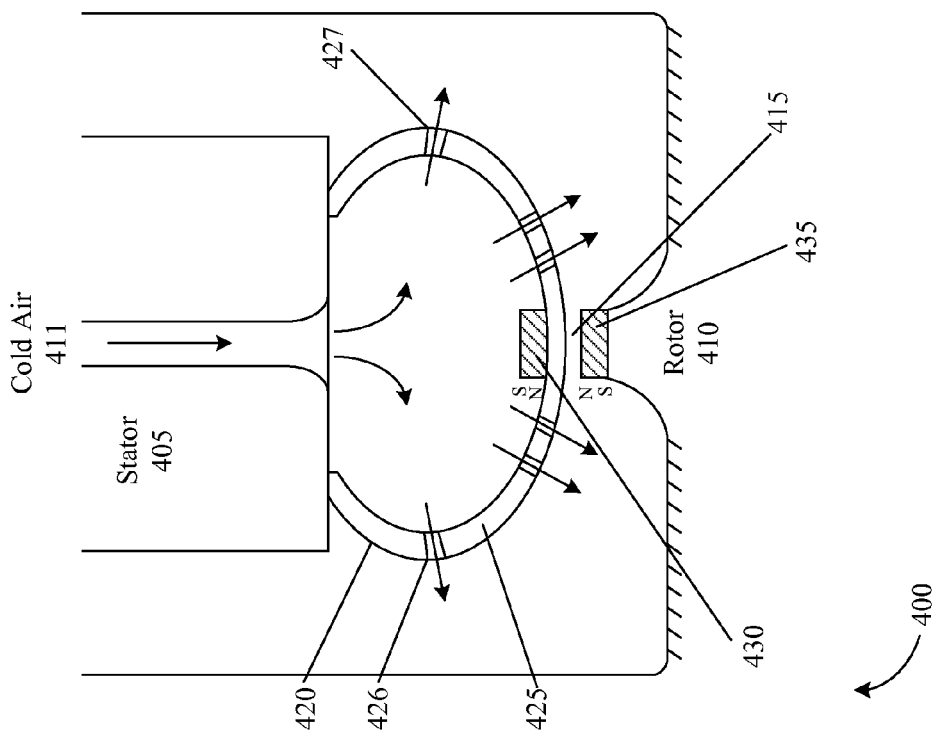

FIG. 4 illustrates an exemplary apparatus for providing a magnetic seal.

Figure 5:
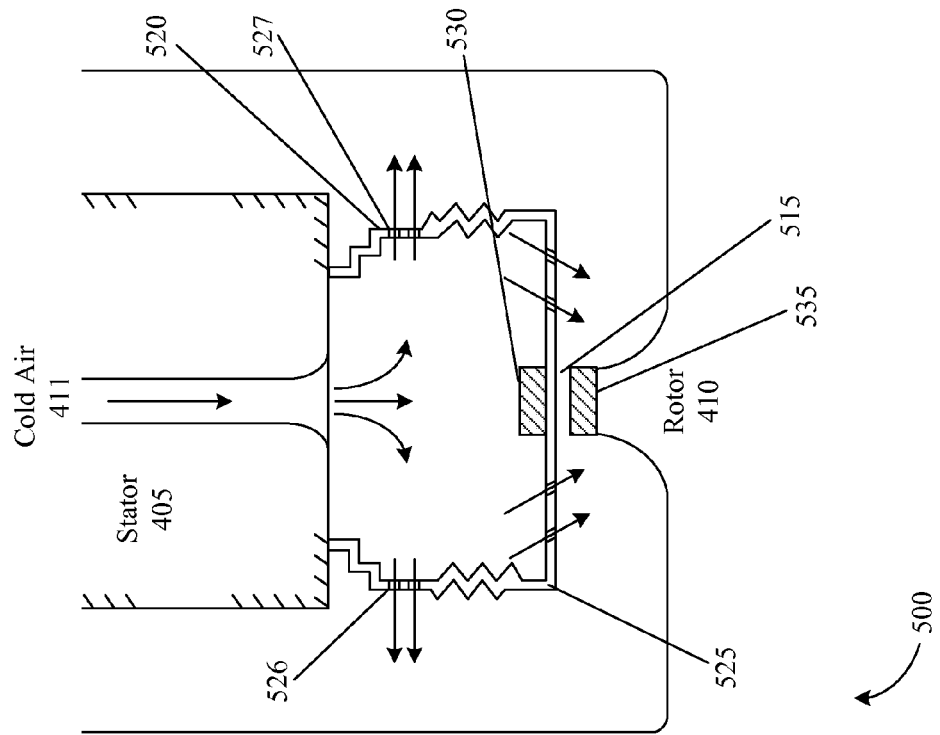

FIG. 5 illustrates an exemplary apparatus for providing a magnetic seal.

Figure 6:
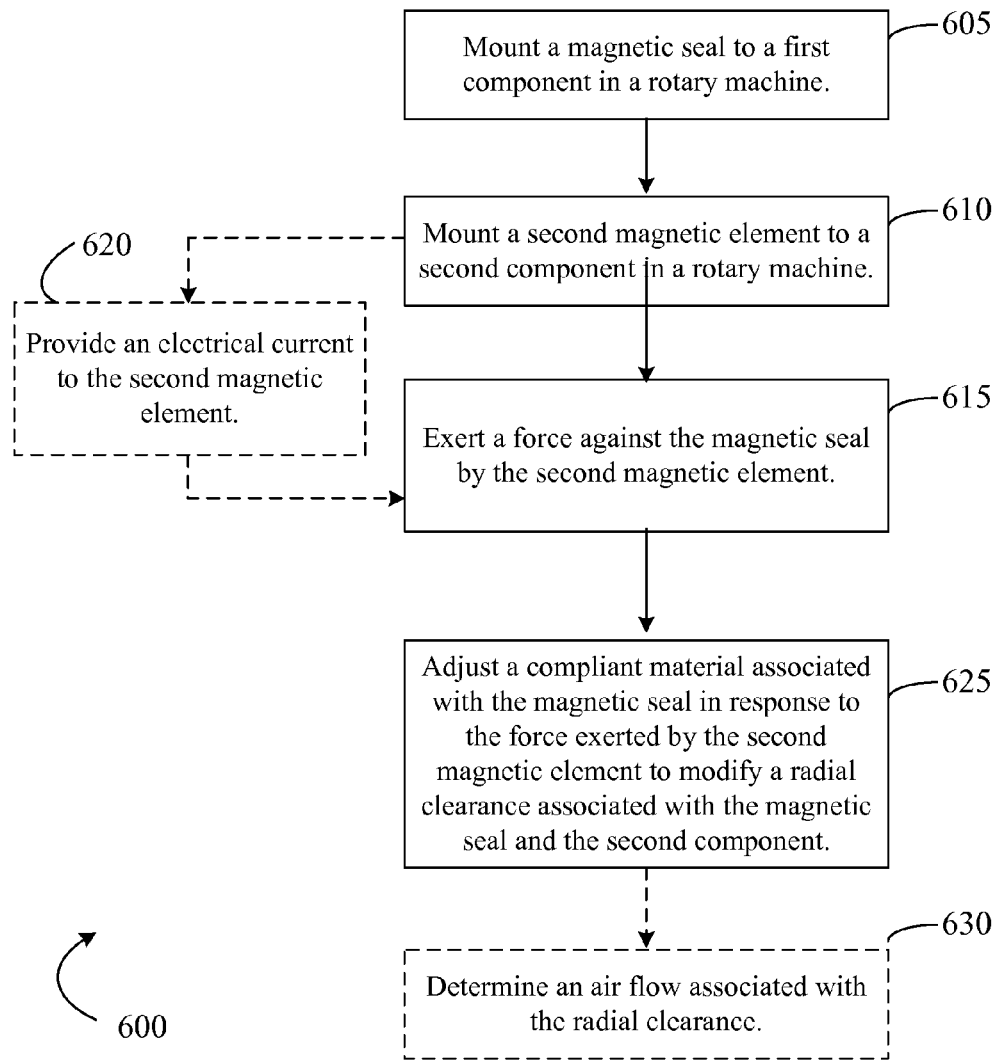

FIG. 6 illustrates an exemplary method for providing a magnetic seal in accordance with one embodiment of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

FIG. 1 illustrates a stationary and rotating component as part of a system 100. System 100 can include any rotary machine, such as a combustion-type gas turbine, a steam-type gas turbine, a compressor, or the like. In a combustion-type gas turbine, a gas path can exist which includes, in serial-flow relationship, an air intake (or inlet), a compressor, a combustor, a turbine, and a gas outlet (or exhaust nozzle). In operation, combustion gases can be used in a combustion-type gas turbine to drive the turbine section. That is, combustion gases can be used to turn, at a relatively high speed, a plurality of rotor wheels carrying a plurality of rotor blades axially spaced about each rotor wheel. Such rotor wheels can be rotatably attached to a plurality of surrounding non-rotating stators, wherein a gap can be formed between the rotor wheel and the surrounding stators.

Because air leakage within this gap can cause power losses and can harm system efficiency, it may be desirable to reduce this gap according to component design. At the same time, because these stationary and rotating components can shift, vibrate, or expand due to thermal effects, maintaining a minimal clearance gap may also be desired. For example, during transient operation, one or more components can move relative to each other, meaning that if the gap separating these components is too small, the components can contact one another, leading to component damage. Thus, a minimal clearance gap is likely to be required. While the size of this clearance gap can be reduced by using materials for the rotating and stationary components with different coefficients of thermal expansion, it can not be reduced completely. The relative movement of the rotating component in relation to the stationary component requires some clearance gap be maintained.

To reduce air leakage associated with the clearance gap between two components in a rotary machine, such as a rotating rotor wheel and a stationary stator, one or more seals can be used. In system 100, a honeycomb-type labyrinth seal can be used to modify the air flow between stationary and rotating components. The labyrinth seal teeth 105 can be mounted on the rotor wheel 110 and lie in radial opposition to a honeycomb structure 115 mounted to part of the stator 120. The honeycomb-type labyrinth seal of system 100 can inhibit air flow between rotor wheel 110 and stator 120. During operation, the honeycomb-type labyrinth seal wears away as the surface structures of rotor wheel 110 and stator 120 approach each other, which can be due to thermal transients and/or due to engine vibration. That is, as the two components approach one another, they are likely to contact one another, resulting in friction that can wear away the honeycomb-type labyrinth seal. As the honeycomb-type labyrinth seal wears away, system 100 may fail. In addition, friction can lead to temperature increases in system 100, which can inhibit the performance of system 100. It is sometimes desirable to reduce these effects and increased instances of failure associated with conventional system 100.

FIG. 2 and FIG. 3 illustrate exemplary systems 200 and 300 for providing a magnetic seal according to one embodiment of the invention. System 200 and/or system 300 can be a portion of any type of rotary machine, such as a compressor, a turbine, or a pump. In the exemplary embodiment, system 200 represents a compressor and can include a first component and a second component. For instance, a first component can include stationary component 205, which can surround a second component, such as rotating component 210. The stationary component 205 is positioned in relation to the rotating component 210 to form a gap 215 between them.

Rotating component 210 can be transversely mounted to an axle and can be configured to rotate while surrounded by stationary component 205. It will appreciated that rotating component 210 can be any rotating component in a rotary machine such as, but not limited to, a turbine wheel, a compressor wheel, a bearing assembly, or a shaft. Gap 215 can allow air to flow axially between rotating component 210 and stationary component 205. It will be appreciated that while in the exemplary embodiment gap 215 is described in relation to a radial clearance between rotating component 210 and stationary component 205, gap 215 can comprise any gap in a machine that may exist between a first component and a second component in the machine such as, but not limited to, a radial clearance, an axial clearance, a linear clearance, a non-linear clearance, or the like.

In the exemplary embodiment, gap 215 can represent a radial clearance that can allow for axial air flow. To reduce the axial air flow associated with gap 215, a magnetic seal 220 can be provided. The magnetic seal 220 can comprise a compliant material and a first magnetic element. A compliant material can comprise any deformable structure such as a baffle or a collapsible foil. In one embodiment, the compliant material can be mounted to the stationary component and the first magnetic element can be mounted to the compliant material. In other embodiments, the first magnetic element and the compliant material can be integrated to provide a magnetically compliant structure.

In exemplary systems 200 and 300, the compliant material can include a baffle 225. Baffle 225 can comprise a compliant sheet metal structure adapted to conform around the rotating component 210 and to reduce gap 215. Mounted to baffle 225 can be the first magnetic element, such as seal magnet 230; and mounted to rotating component 210 can be a second magnetic element, such as rotating magnet 235.

Seal magnet 230 and rotating magnet 235 can be any type of magnet, such as a permanent magnet, an electro-magnet, or the like. A permanent magnet can be characterized by a Curie point. A Curie point defines a temperature where the permanent magnet is demagnetized. Rare earth magnets, such as samarium cobalt magnets or neodynium magnets or the like, have a relatively high Curie point, meaning they can withstand relatively high temperatures. Partially for this reason, in some embodiments where system 200 comprises a portion of a high temperature turbine stage or those embodiments where seal magnet 230 and/or rotating magnet 235 are exposed to high temperatures, a rare earth magnet that can resist high temperatures can be used.

Rotating magnet 235 can be configured to exert force against the magnetic seal 220 comprising baffle 225 and seal magnet 230. In exemplary system 200, this configuration can include mounting rotating magnet 235 to rotating component 210 in relatively close proximity to seal magnet 230 and orienting rotating magnet 235 so that the north pole of rotating magnet 235 opposes the corresponding north pole of seal magnet 230. In another embodiment, rotating magnet 235 can be mounted so that the south pole of rotating magnet 235 opposes the corresponding south pole of seal magnet 230. In these ways, rotating magnet 235 and seal magnet 230 repel each other, and because seal magnet 230 is mounted to the compliant baffle 225, compliant baffle 225 can bend in response to the repelling force. When rotating component 210 is in motion, baffle 225 can further conform to movement associated with rotating component 210 to maintain the size of gap 215 without physically contacting rotating component 210, thereby providing a sealing surface that can conform with component movement. Such movement associated with components can partially be the result of thermal expansion and/or vibration.

In addition to providing a conformable sealing surface during transient events, rotating magnet 235 and magnetic seal 220 can be adapted to provide a conformable sealing surface in the presence of hydrodynamic forces. Hydrodynamic forces are forces exerted on a bodies when certain regimes of flow are imposed upon the surface of the body. In the exemplary embodiment, magnetic seal 220 can be further adapted to provide a conformable sealing surface in the presence of hydrodynamic forces and/or transient events.

To illustrate with reference to FIG. 3, because system 300 can be a compressor, during operation pressures P1 at 340 and P2 at 345 can be associated with stationary component 205 and rotating component 210. In the compressor embodiment, pressure P2 at 345 can be relatively greater than pressure P1 at 340, meaning that pressure P2 at 345 can push down on the compliant baffle 225 to reduce the size of gap 215 as rotating component 210 rotates about an axle. Without rotating magnet 235, when pressure P2 at 245 is sufficiently larger than pressure P1 at 240, baffle 225 can bend down toward rotating component 210, resulting in physical contact between the rotating component 210 and the baffle 225. During a transient event, such as those associated with thermal expansion, rotating component 210 can extend towards stationary component 205 such that rotating component 210 can again contact baffle 225, if not stationary component 205 as well.

Rotating magnet 235, by exerting force against magnetic seal 220, can maintain the size of gap 215 to provide a relatively consistent seal. In operation, the repelling force of rotating magnet 235 can cause baffle 225 to adjust from a nominal position at 350 to a displaced position at 355 as either pressure gradients or physical expansions associated with thermal effects and/or vibration cause rotating component 210 to approach baffle 225 and stationary component 205. In other words, once the non-conforming surface of rotating component 210 moves in relation to the conforming surface of baffle 225, the magnetic repulsion force associated with seal magnet 230 and rotating magnet 235 can deform said conforming surface to preclude contact between components and to maintain gap 215.

In at least this way, certain embodiments of the invention can employ magnetic forces to provide a continuously variable sealing surface that can maintain the size of gap 215 without regard to vibration and/or thermal expansion. In addition, because the size of gap 215 can be maintained, the amount of axial air flow can be controlled without using a seal that physically contacts static component 205 and rotating component 210.

In other embodiments of the invention, systems 200 and/or 300 can include a sensing device for determining the size of the radial clearance associated with gap 215. In one embodiment, baffle 225 can be modified to generate a relatively small amount of electrical current based at least in part on the rotational movement of rotating magnet 235, such as by mounting a conductive circuit and/or inductive coil to baffle 225. The circuit and/or coil can be adapted to sense the magnetic flux generated by the rotating magnet 235 and to generate a corresponding electrical current partially as a result of the rotational movement of rotating magnet 235.

The magnitude of the current generated by the rotational movement of rotating magnet 235 can be sensed by an appropriate sensing device, such as an electrical sensor, and associated with the size of gap 215. Appropriate sensing devices can include, but are not limited to, a multi-meter, an ammeter, a voltmeter, or the like. Association of the size of the gap 215 can be performed by one or more processors adapted to receive electrical current information from the sensing device. In one embodiment, the size of the gap 215 can be determined by the processor based at least in part on electrical current information received from the sensing device. In another embodiment, the processor can be adapted to receive information from the sensing device and to determine an air flow associated with the gap based at least in part on the electrical current generated by the at least one magnetic seal. Embodiments of a processor can include, but are not limited to, an ASIC, a comparator, a differential module, or other hardware means. A processor can also comprise software or other computer-executable instructions that may be stored in a memory and may be executable by the processor or other processing means to perform one or more operations described above.

In other embodiments of the invention, electro-magnets can be used in place of, or in combination with, the permanent magnets described above. For instance, in one embodiment, rotating magnet 235 can be an electro-magnet. To exert force against the magnetic seal 220 comprising baffle 225 and seal magnet 230, current can be provided to rotating magnet 235 to magnetize the electro-magnet. As current is increased, the amount of force exerted against the magnetic seal 220 comprising baffle 225 and seal magnet 230 can likewise be increased, thus increasing the displacement of baffle 225. As current is decreased, the amount of force exerted against the magnetic seal comprising baffle 225 and seal magnet 230 can likewise be decreased, thus decreasing the deflection of baffle 225. In these ways, the size of gap 215 can be increased or decreased, and the amount of axial air flow through gap 215 adjusted, by varying the amount of current provided to rotating magnet 235.

FIG. 4 and FIG. 5 illustrate example systems and apparatuses 400 and 500 for providing a magnetic seal according to other embodiments of the invention, wherein embodiments 400 and 500 can comprise a portion of a rotary machine, like a turbine system. Similar to system 200, systems 400 and 500 can comprise a stationary component, such as stator 405, and a rotating component, such as rotor wheel 410. Stator 405 can be positioned in relation to the rotor wheel 410 to form a gap 415 and a gap 515 characterized by a radial clearance. Exemplary systems 400 and 500 can be configured to operate at high temperatures, such that cooling air can be provided to stator 405 at 411 to regulate the operating temperature of stator 405.

Systems 400 and 500 can further include one or more magnetic seals. System 400, for example, can include magnetic seal 420 comprising collapsible foil 425 and seal magnet 430. Collapsible foil 425 can be relatively structured to resemble a torus. In system 500, which includes magnetic seal 520 comprising collapsible foil 525 and seal magnet 530, collapsible foil 525 can be structured to resemble an accordion-like structure. In both embodiments, collapsible foil 425 and collapsible foil 525 can be configured to adjust outward in response to pressure provided by the supply of cooling air at 411. Magnetic seal 420 and magnetic seal 520 can also be adapted to reduce the amount of cooling air provided at 411 from escaping stator 405 to maintain stator 405 at a relatively lower temperature, such as about 600-800° F. In the exemplary embodiments, collapsible foil 425 and collapsible foil 525 can include vias 426, 427, 526, and 527 respectively for modifying and/or limiting the amount of cooling air escaping from stator 405 partially for maintaining a relatively consistent air pressure within stator 405.

It will be appreciated that as magnetic seals 420 and 520 can be adapted to maintain a relatively consistent air pressure, magnetic seal 420 and magnetic seal 520 can also be adapted to channel cooling air being provided at 411 to certain components in systems 400 and 500. These components can include one or more components associated with the magnetic seals 420 and 520. For example, vias 426, 427, 526, and 527 can be positioned to direct cooling air to the rotating magnets 435 and 535. In some embodiments, such as a gas turbine system, rotating magnets 435 and 535 can be exposed to relatively high temperatures, and if left uncooled, could become demagnetized. Demagnetization could be associated with a malfunction of magnetic seals 420 and 520. Partially for this reason, vias 426, 427, 526, and 527 can be adapted to channel cooling air to rotating magnets 435 and 535 to enable rotating magnets 435 and 535 to operate below their relevant Curie point where demagnetization could occur.

In exemplary systems 400 and 500, collapsible foil structures 425 and 525 can also be configured to adjust inward in response to the force exerted by rotating magnets 435 and 535 mounted to rotor wheel 410 until an equilibrium point is reached. More specifically, collapsible foil 425 and collapsible foil 525 can be configured to adjust inwardly from rotor wheel 410 as rotor wheel 410 creeps towards magnetic seals 420 and 520, such as the result of thermal expansion and/or vibration. Given that corresponding air pressure provided at 411 pushes magnetic seals 420 and 520 outward, the opposing magnetic forces provided by magnets 430 and 435 in system 400, and magnets 530 and 535 in system 500, push the magnetic seals inward, until a balance of forces is obtained. At this equilibrium point, the size of gap 415 and gap 515 in systems 400 and 500 can be relatively maintained.

FIG. 6 illustrates exemplary method 600 for providing a magnetic seal according to another embodiment of the invention. Method 600 can begin at block 605 where a magnetic seal can be mounted to a first component in a rotary machine. The rotary machine can include any machine having rotating components such as a turbine, a compressor, a pump, or the like. A first component can be a stationary component, such as a stator, a portion of a stationary component, a rotating component, such as a rotor, or a portion of a rotating component. The magnetic seal, meanwhile, can comprise a first magnetic element and a compliant material. Example embodiments of magnetic seals comprising a first magnetic element and a compliant material can include those described in relation to FIG. 1 through FIG. 5 above. It will be appreciated that the first magnetic element can be any magnetic element like a permanent magnet or an electro-magnet.

Method 600 can continue at block 610 where a second magnetic element can be mounted to a second component in the rotary machine. The second component can include any component in a rotary machine, such as, for example, a rotating component or a stationary component. The second component can be positioned relative to the magnetic seal as mounted on the first component to provide a radial clearance between the second component and the at least one magnetic seal. Such a radial gap, like gap 215 in FIG. 2, can allow air to flow axially between the first component and the second component, like stationary component 205 and rotating component 210 also described above in relation to FIG. 2.

The second magnetic element can be any magnetic element like a permanent magnet or an electro-magnet and can be configured to exert force against the magnetic seal at block 615. In one embodiment, the second magnetic element can be a permanent magnet and configured in relation to the first magnetic element, which can also be a permanent magnet, so that the poles of the first magnetic element and the second magnetic element are positioned opposite one another. In this way, the second magnetic element can exert force against the magnetic seal. In another embodiment, either the second magnetic element or the first magnetic element can be an electro-magnet and electrical current provided to the electro-magnet to enable the magnetic element to exert force against the magnetic seal. For instance, in one embodiment of method 600 as shown at optional block 620, the second magnetic element can be an electro-magnet and current provided to the electro-magnet so that the second magnetic element can exert force against the magnetic seal. Again, in this embodiment, the poles of the electro-magnet can be positioned in relation to the first magnetic element such that the poles of the second magnetic element and the first magnetic element oppose one another. Such positioning can be accomplishment by either a physical arrangement or by the biasing of current provided to the electro-magnet.

At block 625, method 600 can continue with adjusting the compliant material comprising the magnetic seal in response to the force exerted by the second magnetic element. This adjustment can modify the radial clearance between the magnetic seal and the second component. In one embodiment, this adjustment can be associated with determining an axial air flow between the first component and the second component as shown at optional block 630. For instance, the first magnetic element and second magnetic element can be designed to maintain a minimal clearance gap for a given operating point of the rotary machine. In another embodiment where the first magnetic element and/or the second magnetic element are electro-magnets, electrical current provided to either magnetic element can be adjusted to adjust the radial clearance, and thereby adjust the axial air flow. As the radial clearance is adjusted, the axial air flow can be determined according to one or more parameters associated with the rotary machine.

Because certain embodiments of the invention can maintain the radial clearance associated with a first component and a second component without requiring physical contact with the magnetic seal, certain embodiments of the invention can solve particular problems associated with seals that rub or come into contact with each other during machine operation. More particularly, certain embodiments of the invention can provide seals that degrade less and seal better than those provided in conventional systems. Improved seal performance is at least one technical effect of the invention. Improved seal durability is at least one other technical effect of the invention.

Furthermore, because certain embodiments of the invention can provide a sealing surface between a first component and a second component without any associated friction, such embodiments of the invention can improve the operational life span of some components. Without friction between the magnetic seal and the sealing surface, there is reduced heating effects associated with the seal and its corresponding sealing surface. With reduced heating effects comes a reduced thermal profile for one or more components associated with these sealing surfaces. A reduced thermal profile for one or more components can result in a longer life span of the components as well as the rotary machine. Improved operational life spans for rotary machines and machine components are other technical effects of the invention.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method comprising:
   mounting at least one magnetic seal to a first component in a rotary machine, wherein the at least one magnetic seal comprises a first magnetic element and a compliant material;

mounting a second magnetic element to a second component in the rotary machine, wherein the second component is positioned relative to the first component to provide a gap between the second component and the at least one magnetic seal, and wherein the second magnetic element is operable to exert force against the at least one magnetic seal; and adjusting the compliant material to modify the gap in response to the force exerted by the second magnetic element, wherein the compliant material is configured to restrict a gas flow between two chambers of the rotary machine.

2. The method of claim 1, wherein mounting the at least one magnetic seal to the first component in the rotary machine comprises:

mounting at least one magnetic seal to the first component in at least one of the following: a turbine, a compressor, or a pump.

3. The method of claim 1, wherein mounting the second magnetic element to the second component in the rotary machine comprises:

mounting the second magnetic element to at least one of the following: a turbine wheel, a compressor wheel, a bearing assembly, or a shaft.

4. The method of claim 1, wherein the compliant material comprises at least one of the following: a baffle, a collapsible foil, and a deformable structure.

5. The method of claim 1, wherein mounting the second magnetic element to the second component in the rotary machine comprises:

mounting a permanent magnet to the second component in the rotary machine.

6. The method of claim 5, wherein the second magnetic element comprises at least one of the following materials: samarium, cobalt, neodymium, iron, and boron.

7. The method of claim 1, further comprising:

generating electrical current by the at least one magnetic seal based at least in part on a rotational motion associated with the second component; and determining an air flow associated with the gap based at least in part on the electrical current generated by the at least one magnetic seal.

8. The method of claim 1, wherein the second magnetic element mounted to the second component is an electro-magnet, and the method further comprises:

providing electrical current to the second magnetic element to exert force against the at least one magnetic seal.

9. The method of claim 8, further comprising:

adjusting the electrical current provided to the second magnetic element to modify the gap.

10. A system comprising:

a rotary machine comprising a first component and a second component;

at least one magnetic seal mounted to the first component and positioned relative to the second component to provide a gap between the second component and the at least one magnetic seal, wherein the at least one magnetic seal comprises a first magnetic element and a compliant material, wherein the compliant material is configured to restrict a gas flow between two chambers of the rotary machine; and a second magnetic element mounted to the second component operable to exert force against the at least one magnetic seal, wherein the compliant material is operable to adjust in response to the force exerted by the second magnetic element to modify the gap between the second component and the at least one magnetic seal.

11. The system of claim 10, wherein the rotary machine comprises at least one of the following: a turbine, a compressor, and a pump.

12. The system of claim 10, wherein the second component comprises at least one of the following: a turbine wheel, a compressor wheel, a bearing assembly, and a shaft.

13. The system of claim 10, wherein the compliant material comprises at least one of the following: a baffle, a collapsible foil, and a deformable structure.

14. The system of claim 10, wherein the second magnetic element is a permanent magnet.

15. The system of claim 14, wherein the second magnetic element comprises at least one of the following materials: samarium, cobalt, neodymium, iron, and boron.

16. The system of claim 10, wherein the system further comprises:

at least one sensor operative for measuring electrical current and coupled to the at least one magnetic seal, wherein the at least one magnetic seal is operative to generate electrical current based at least in part on a rotational motion associated with the second component; and at least one processor operable to receive electrical current information from the at least one sensor and to determine an air flow associated with the gap based at least in part on the electrical current generated by the at least one magnetic seal.

17. The system of claim 10, wherein the second magnetic element is an electro-magnet, and the system further comprises:

at least one source of electrical current operative to provide electrical current to the second magnetic element to exert force against the at least one magnetic seal.

18. An apparatus comprising:

at least one magnetic seal comprising a first magnetic element and a compliant material, wherein the at least one magnetic seal is operable to mount to a first component in a rotary machine, and wherein the compliant material is configured to restrict a gas flow between two chambers of the rotary machine; and a second magnetic element operable to mount to a second component in the rotary machine and further operable to exert force against the at least one magnetic seal.

19. The apparatus of claim 18, wherein the compliant material comprises at least one of the following: a baffle, a collapsible foil, and a deformable structure.

20. The apparatus of claim 18, wherein the second magnetic element is a permanent magnet.

* * * * *